United States Patent
Salimando

(10) Patent No.: US 6,563,915 B1
(45) Date of Patent: May 13, 2003

(54) METHOD AND APPARATUS FOR AN AUTOMATIC BARGE-IN SYSTEM

(75) Inventor: Steven Charles Salimando, Little Silver, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/005,256

(22) Filed: Jan. 9, 1998

(51) Int. Cl.⁷ .......................... H04M 3/20; H04M 3/42; H04M 3/436; H04M 3/56; H04M 3/58
(52) U.S. Cl. ............... 379/208.01; 379/48; 379/196; 379/204.01; 379/207.05; 379/207.13
(58) Field of Search ......................... 379/201, 204, 379/205, 207, 208, 243, 244, 201.01, 201.02, 207.04, 207.05, 207.13, 208.01, 48, 196, 197, 198, 204.01

(56) References Cited

U.S. PATENT DOCUMENTS 3,917,910 A * 11/1975 Nielson .................. 379/208 X
6,310,946 B1 * 10/2001 Bauer et al. ........... 379/208.01

* cited by examiner

Primary Examiner—Harry S. Hong

(57) ABSTRACT

The invention provides a system that includes a method and apparatus for automatically barging-in on telephone calls. When a first party is talking to a second party, a third party may be automatically connected to the first party and the second party given an option to hold or leave a voice mail message. In addition, when a first party is connected to a stored information service provider, a third party may be automatically connected to the first party and a bookmark is set in the stored information. If the call between the first party and the third party does not exceed a predetermined time limit, the first party may resume the stored information service from the location of the bookmark.

22 Claims, 6 Drawing Sheets

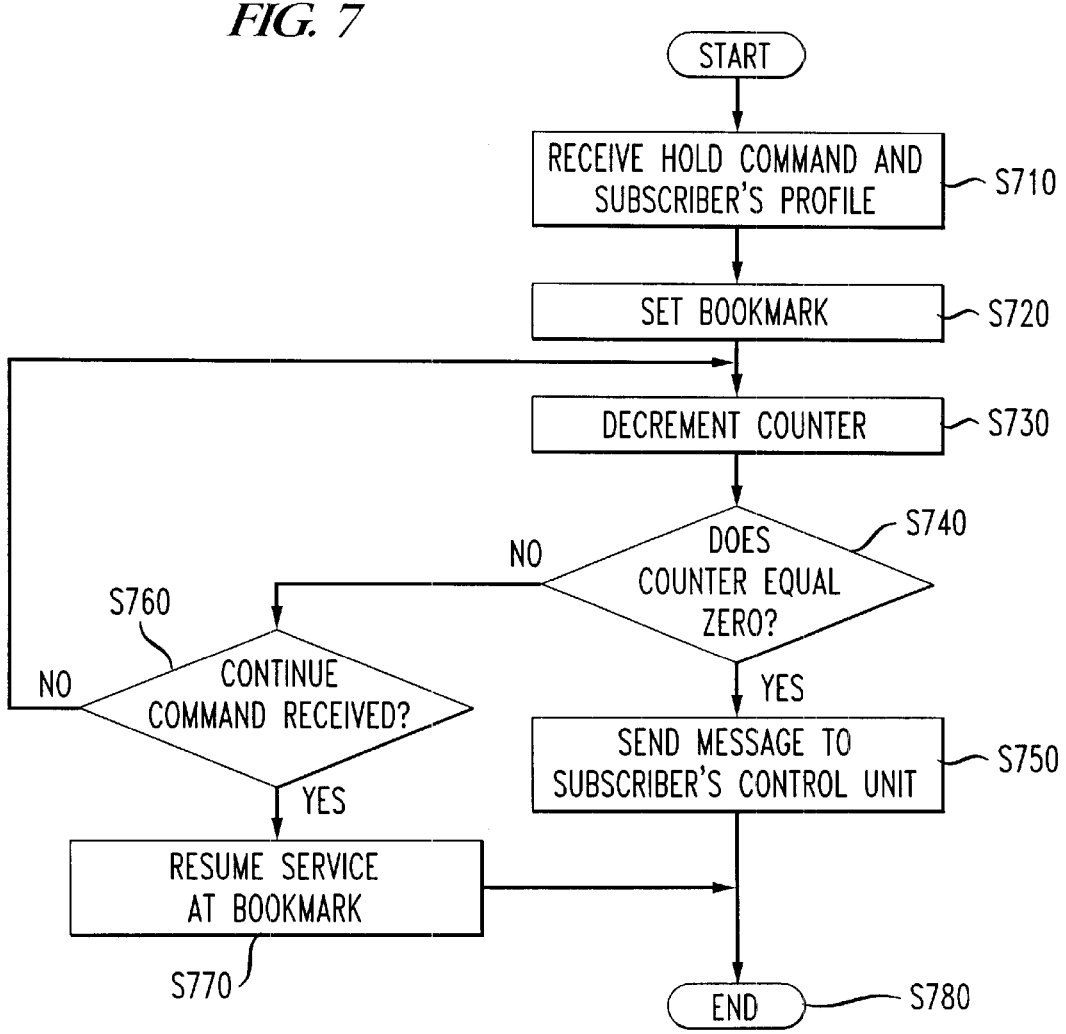

METHOD AND APPARATUS FOR AN AUTOMATIC BARGE-IN SYSTEM

BACKGROUND OF THE INVENTION

1. Field of Invention

This invention relates to a method and apparatus for automatically connecting a third party with one of two parties engaged in a telephone call, and temporarily or permanently disconnecting the other party.

2. Description of Related Art

The delivery of stored information in the form of training tape programs, recorded instructions, 1-900 service, voice-mail, etc., is becoming increasingly popular. Users may be required to spend several minutes or hours listening to this stored information during any given session. However, while listening to the stored information, the users cannot automatically receive important calls without terminating or interrupting the information service.

In addition, if a first party is connected to a second party and engaged in conversation, for example, a third party may attempt to contact the first party and be handled in a call waiting system. However, in a call waiting system, the first party places the second party on hold, talks to the third party, places the third party on hold, talks to the second party to finish that call, then goes back to the third party to begin the desired conversation. This process can be burdensome if the third party is an important caller.

SUMMARY OF THE INVENTION

An automatic barge-in device automatically interrupts a subscriber's stored information service or telephone call and connects the subscriber with another telephone call. The automatic barge-in device operates such that when a first party is talking to a second party, a third party may be automatically connected to the first party and the second party given an option to hold, leave a voice mail message, etc.

In addition, when a first party is connected to a stored information service, a third party may be automatically connected to the first party and a bookmark is set in the stored information. If the call between the first party and the third party does not exceed a predetermined time limit, the first party may resume the stored information service from the location of the bookmark.

BRIEF DESCRIPTION OF THE DRAWINGS

The invention is described in detail with reference to the following drawings, wherein like numerals represent like elements, and wherein:

FIG. 7 is a flowchart of the automatic barge-in process for the control unit of a stored information service provider.

DETAILED DESCRIPTION OF PREFERRED EMBODIMENTS

Figure 1:
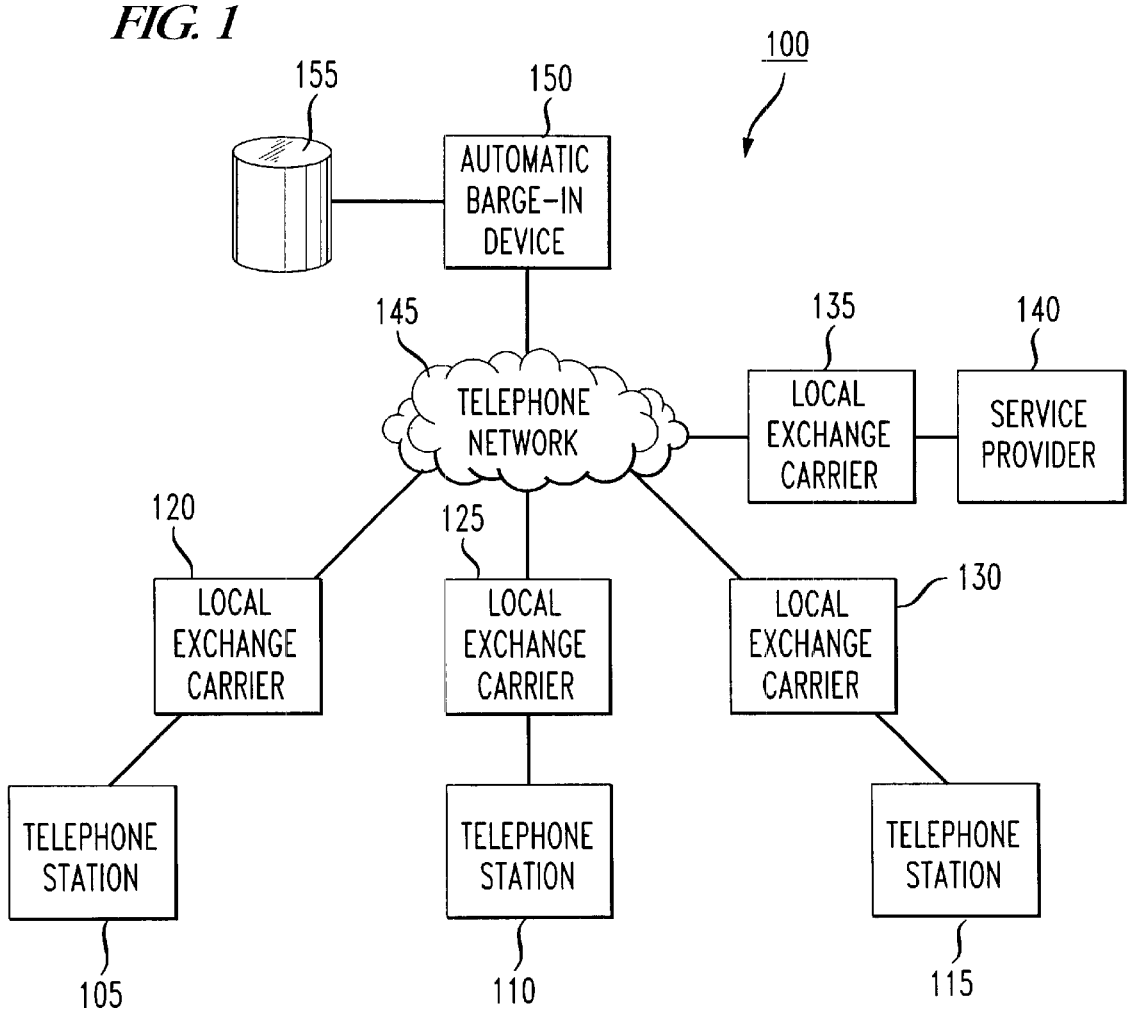
FIG. 1 is a block diagram of an exemplary automatic barge-in system.

FIG. 1 shows an exemplary embodiment of an automatic barge-in system 100 that includes a telephone network 145 connected to several telephone stations 105, 110 and 115, and a service provider 140, through local exchange carriers 120, 125, 130 and 135, respectively. The telephone stations 105, 110 and 115 may represent telephone stations, personal computers, or any other device which may send and receive communications. The local exchange carriers 120, 125, 130, and 135 include well known switching technologies for connecting and routing calls (i.e., the Lucent 5ESS, etc.) and may be represented other network access providers, such as wireless, satellite and Internet service control units. The service provider 140 may represent any device which provides a stored information service to telephone customers, such as a service for providing training programs by tape, 1-900 service, voice-mail, etc. The communications network 145 is also connected to an automatic barge-in device 150. The automatic barge-in device 150 is connected to a database 155. The database 155 may be any memory device internal or external to the automatic barge-in device 150.

The automatic barge-in device operates such that when a subscriber (first party) at telephone station 105 is connected to a second party at telephone station 110, and if a third party at telephone station 115 attempts to contact the subscriber at telephone station 105, the call is routed through the local exchange carrier 130, the telephone network 145 and the automatic barge-in device 150. If the subscriber's telephone station 105 is busy (e.g., off-hook), the automatic barge-in device 150 retrieves the subscriber's profile from the database 155 to determine whether the subscriber desires the third party to barge-in.

If the third party is found in a barge-in list of the subscriber, the automatic barge-in device 150 connects the subscriber to the third party and handles the second party based on the subscriber's instructions stored in a subscriber profile. Device 150 then handles the profile. For example, the second party may be offered options such as hold, leave a message, call-back, etc.

If the second party is the service provider 140 providing a stored information service, for example, the automatic barge-in device 150 connects the subscriber to the third party and instructs the service provider 140 to place a bookmark in the stored information so that the subscriber may resume listening to the information when the call between the subscriber and the third party is completed.

While FIG. 1 shows the automatic barge-in device 150 as a centralized unit, the automatic barge-in device 150 may be distributed throughout the telephone network 145. When distributed, the local exchange carriers 120, 125, 135, and 140 serve as control units of the automatic barge-in device 150 performing all of its functions. For the following description, a distributed automatic barge-in device 150 is assumed for ease of discussion.

Figure 2:
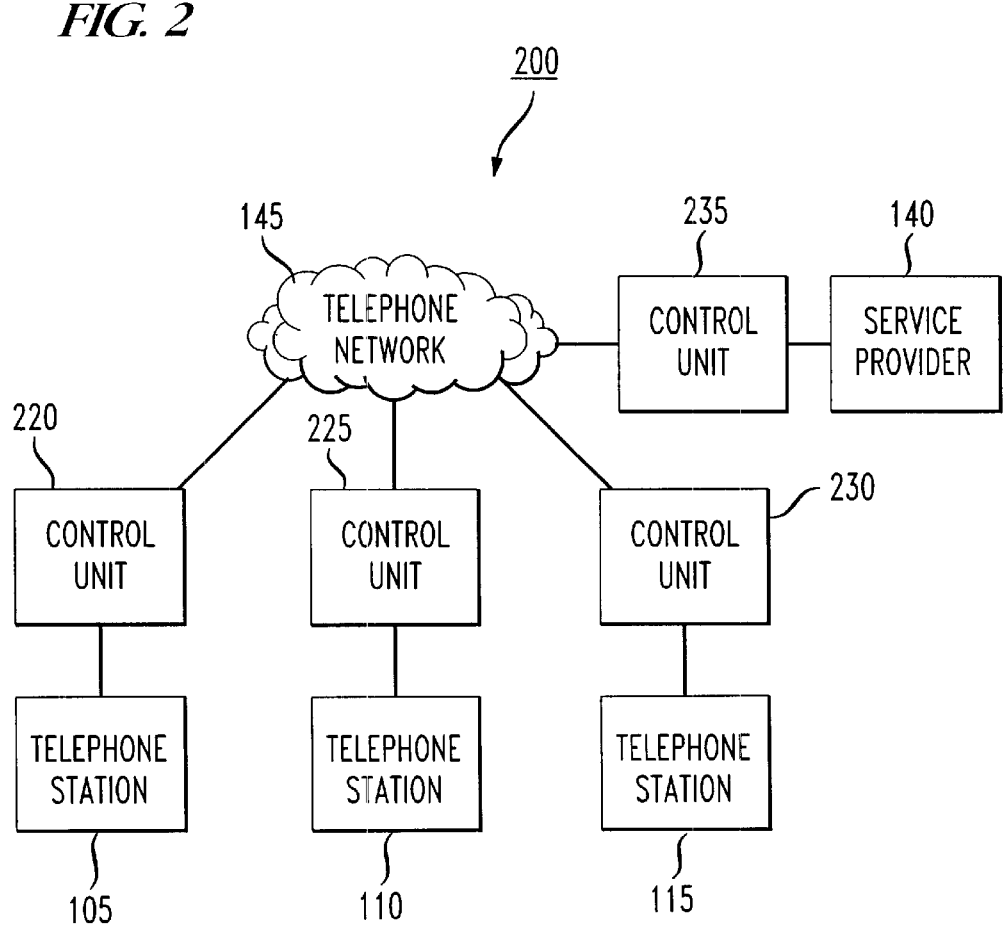
FIG. 2 is an example of a distributed automatic barge-in system.

FIG. 2 shows an example of a distributed automatic barge-in system 200. Telephone network 145 is connected to the telephone stations 105, 110 and 115 through control units 220, 225 and 230, respectively. The telephone network 145 is also connected to the service provider 140 through control unit 235. The control units 220, 225, 230, and 235 interface with the telephone network 145 and serve as control units of the automatic barge-in device 150 performing all of its functions. For ease of discussion, the control units 220, 225, 230, and 235: 1) are assumed to be similar in structure; 2) may handle more than one telephone station; and 3) include a database similar to database 155 as an internal or external memory. When external, the database 155 may be centralized even if the automatic call-back device is distributed.

When the subscriber at telephone station 105 is connected in a call to a second party at telephone station 110, the call is routed through the telephone network 145, the subscriber's control unit 220 and the second party's control unit 225. While the subscriber's control unit 220 and the second party's control unit 225 are described as separate units, the subscriber's telephone station 105 and the second party's telephone station 110 may be handled by the same control unit, for example.

If a third party at telephone station 115 attempts to contact the subscriber, the control unit 220 retrieves and searches the subscriber's profile for the third party's identification and any necessary call handling instructions. If found, the control unit 220 connects the subscriber with the third party and connects the second party to itself.

The control unit 220 informs the second party that the call has been interrupted and provides the second party with several options including, leaving a message, being placed on hold, etc. If the second party wants to leave a message, the control unit 220 records the second party's message and stores it in an internal or external database. When the control unit 220 determines that the connection between telephone station 105 and telephone station 115 is terminated, the control unit 220 provides the subscriber with the second party's message.

If the second party wishes to hold, the control unit 220 monitors the connection between the subscriber's telephone station 105 and the third party's telephone station 115 and decrements a counter. If the counter exceeds a predetermined time limit set by the subscriber and included in the subscriber profile, the control unit 220 again solicits the second party to leave a message. If the second party leaves a message, the control unit 220 stores the message and provides the message to the subscriber when the subscriber goes on hook with respect to the third party. However, if the second party elects to continue holding, the counter is reset and decremented accordingly.

If the second party is the service provider 140 providing a stored information service, the control unit 220 sends a command to stop the stored information service and to place a bookmark in the stored information. When the command is received, the control unit 235 puts the service provider 140 on hold until the subscriber completes the third party barge-in call and returns to the stored information service. However, if a predetermined time limit is exceeded, the control unit 235 disconnects from the subscriber and the subscriber must call the service provider 140 again to complete the stored information service.

When placed on hold, the service provider 140 remembers where the subscriber left off the stored information as the bookmark. When the subscriber returns within the predetermined time limit, the stored information service automatically restarts the stored information starting at the bookmark. If the predetermined time limit is exceeded, the bookmark is saved and the option of starting at the bookmark is offered when the subscriber calls the service provider 140 again.

If the predetermined time limit is exceeded, the service provider 140 signals the control unit 235 of its occurrence and the control unit 235, in turn, sends a message to the control unit 220 and goes on-hook with respect to the subscriber. When the subscriber completes the call with the third party, the control unit 220 informs the subscriber that the service provider 140 is disconnected and may offer to call the service provider 140 to reconnect the subscriber to the service provider 140 to restart the stored information service.

The automatic barge-in system 100 may allow a caller to barge-in on a barged-in call. If a fourth party calls while the subscriber is engaged in the call with the third party (who barged-in on the call with the second party), the control unit 220 disconnects the third party from the subscriber and connects the fourth party to the subscriber as another barge-in call. Then, the control unit 220 handles the third party in a manner similar to the way the second party was handled. This process may recur indefinitely. Thus, the automatic barge-in system 100 provides for recursive barge-ins.

When the fourth party's call completes, the control unit 220 reconnects the subscriber to the third party (if the third party is still holding). When the third party's call completes, the control unit 220 reconnects the subscriber to the second party. Thus, the control unit 220 orders the barge-in calls in time order. However, the subscriber may specify in the subscriber profile that recursive barge-in calls be prohibited or limited to only one per call, for example, for courtesy reasons, etc.

The time ordering may be optionally modified by a priority order, for example. The subscriber may identify parties in priority order in the profile or assign a priority when the barge-in occurred. The time ordered barge-in calls are modified to place higher priority calls earlier in order.

Figures 3, 4:
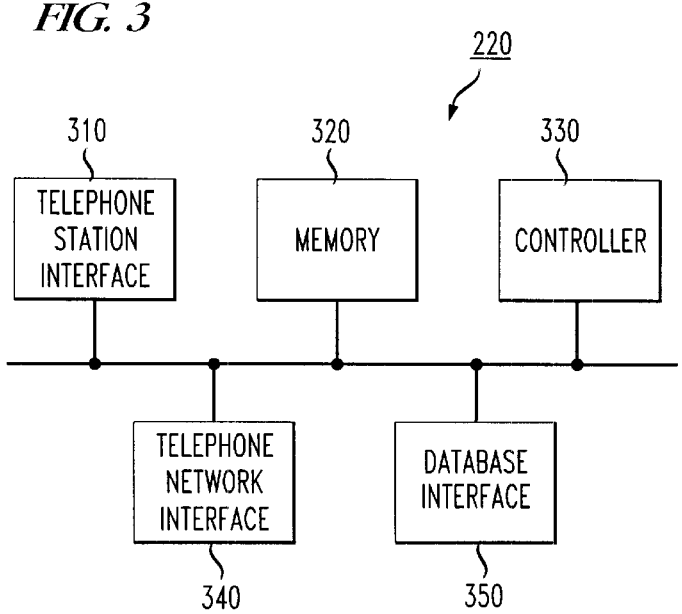
FIG. 3 is a block diagram of the automatic barge-in device.
FIG. 4 is a diagram illustrating sample subscriber profile information for the automatic barge-in device.

FIG. 3 is a block diagram of the control unit 220 which is representative of all of the control units 225, 230 and 235 of the automatic barge-in device 150. The control unit 220 includes a controller 330, a memory 320, a telephone station interface 310, a telephone network interface 340 and a database interface 350.

When a subscriber at telephone station 105 is connected to a second party at telephone station 110, the controller 330 monitors the connection through telephone station interface 310. When a third party at telephone station 115 attempts to contact the subscriber at telephone station 105, the controller 330 receives the call through telephone network interface 340. The controller 330 retrieves the subscriber's profile from the memory 320 or the external database through database interface 350. If the controller 330 determines from the subscriber profile that the subscriber wants the third party connected, the controller 330 connects the call to the third party.

After the subscriber is connected to the third party, the controller 330 signals the second party's control unit 225 controller 330' to inform the second party that the subscriber took another call. The controller 330' queries whether the second party would like to hold, leave a message, receive a call-back, etc. If the second party decides to leave a message, the controller 330' sends the message to the subscriber's control unit 220 and controller 330 stores the message in the memory 320 or in an the external database through database interface 350. When the subscriber completes the call with the third party, the controller 330 retrieves the second party's message from the memory 320 or the external database through the database interface 350, and delivers it to the subscriber.

If the second party decides to hold, the controller 330' decrements a counter which has been set to a predetermined time limit from the subscriber's profile information. If the connection between the subscriber's telephone station 105 and the third party's telephone station 115 has not terminated by the time the predetermined time limit expires, the controller 330' sends another message to the second party at telephone station 110 to solicit whether the second party wishes to leave a message. If the second party leaves a message, the controller 330' send the message to the controller 330 through the telephone interface 310 and stores the message in the memory 320 or the external database through database interface 350. If the second party decides to continue to hold, the controller 330' resets the counter and begins decrementing the counter again.

If, however, the connection between the subscriber's telephone station 105 and the third party's telephone station 115 terminates before the predetermined time limit, the controller 330 of the subscriber's control unit 220 automatically connects the subscriber's telephone station 105 with the second party's telephone station 110.

If the subscriber at telephone station 105 is connected to a stored information service provider 140, the controller 330 monitors the call through the telephone station interface 310. If a second party at telephone station 110 attempts to contact the subscriber at telephone station 105, the controller 330 receives the call through the telephone network interface 340. The controller at 330 then determines whether the subscriber wants to interrupt the stored information service and connect the third party from the subscriber profile information retrieved from the memory 320 or the external database at database interface 350. If the subscriber wants the third party connected, the controller 330 connects the call. The controller 330 sends a signal to the controller 330" in the control unit 335 of the service provider 140 to stop the stored information service and place a bookmark at the stopping point. The controller 330" stops the stored information service and places a bookmark at the stored information service stopping point.

The controller 330" monitors the connection between the subscriber's telephone station 105 and the second party's telephone station 110 and decrements a predetermined counter as retrieved from the subscriber's profile. If the predetermined time limit expires before the connections between the subscriber's telephone station 105 and the second party's telephone station 110 terminates, the controller 330" signals the subscriber's control unit 220 controller 330 that the service provider has logged the subscriber off of stored information service. The subscriber's control unit 220 controller 330 stores a message for the subscriber in the memory 320 or the external database through the database interface 350. After the subscriber's control unit controller 330 determines that the connection between the subscriber's telephone station 105 and the second party's telephone station 110 has terminated, the controller 330 retrieves the message from the memory 320 or the external database through the database interface 350 to inform the subscriber that the stored information service has been terminated.

However, if the connection between the subscriber's telephone station 105 and the second party's telephone station 110 terminates before the predetermined time limit expires, the controller 330 queries the subscriber through the telephone station interface 310 as to whether the subscriber would like the stored information service to resume. If the subscriber requests that the stored information service be resumed, the subscriber's control unit's controller 330 sends a signal to the controller 330' of the service provider's control unit 235 to resume the stored information service at the bookmarked location.

FIG. 4 illustrates a sample of the subscriber profile 400 which may be stored in database 155. For example, the subscriber profile 400 may include: 1) the subscriber's ID number 410; 2) methods for handling "barged-out" parties 420; 3) important phone numbers 430; 4) non-important phone numbers 440 and 5) elapsed time before soliciting a party for a message or logging off a service 450.

In this manner, a subscriber can give the automatic barge-in device 150 several customized options as to how to handle calls while connected to another party or to a stored information service. For example, procedures for handling "barge-out" parties 410 may include a customized message and several options for that party, for example, to hold, leave a message, etc.

In addition, the subscriber may determine the important phone numbers 430 which the subscriber requires be automatically barged-in or non-important phone numbers 440 that he does not want to be barged-in. Thus, the automatic barge-in device 150 may recognize a third-party's telephone number via the caller ID feature, such as Automatic Name Identification (ANI), and compare the number to those listed in the subscriber's profile 400 to determine whether the third party's call should barge-in.

Furthermore, the subscriber may determine a time period in which he wants the barged-out party to be queried before leaving a message 450 so that that party does not become upset. Alternatively, the subscriber may determine a time period before the stored information service is terminated 450. This avoids the subscriber from accumulating additional fees for keeping the service on hold.

Figure 5:
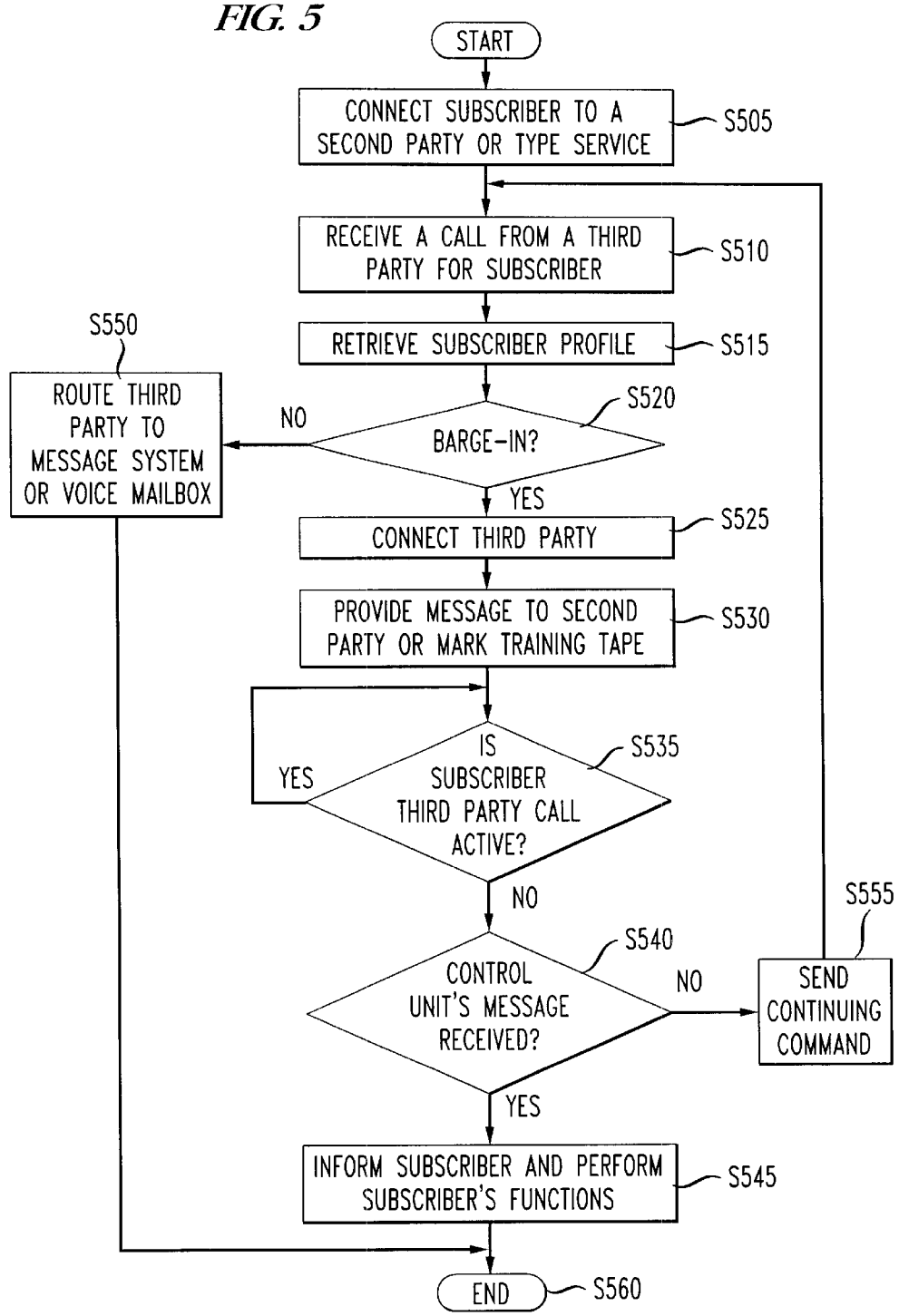
FIG. 5 is a flowchart of the automatic barge-in process.

FIG. 5 is a flowchart describing the automatic barge-in device 150 process. At step S500, control begins and goes to step S505. At step S505, the controller 330 connects the subscriber to a second party or a service provider through telephone network interface 340 and goes to step S510. At step S510, the controller 330 receives a call from a third party for the subscriber through the telephone network interface 340 and goes to step S515. At step S515, the controller 330 retrieves the subscriber's profile 400 from the memory 320 or the external database through database interface 350 and goes to step S520. At step S520, the controller 330 determines whether the subscriber wants the third party to barge-in on the call with the second party or on the service provider's stored information service based on the subscriber profile 400. If the subscriber does not want the third party to barge-in, the controller 330 goes to step S550; otherwise the controller 330 goes to step S525. At step S550, the controller 330 routes the third party to a message system or to a voice mailbox and goes to step S560 and ends.

At step S525, the controller 330 connects the third party to the subscriber and goes to step S530. At step S530, the controller 330 signals the second party's control unit 225 to inform the second party that the call was interrupted. If the second party is a stored information service provider 140, the service provider's control unit 235 controller 330" marks the stored information at the location where the subscriber was interrupted and goes to step S535. At step S535, the controller 330 monitors the connection between the subscriber's telephone station 105 and the third party's telephone station 115. If the call is still active, then the controller 330 returns to step S535. Otherwise, the controller 330 goes to step S540.

At step S540, the controller 330 determines whether a message from either the second party's control unit 225 or the service provider's control unit 235 has been received. The message may indicate that the first caller has left a message, hung up, etc. or that the stored information service has logged-off the subscriber, for example. If no messages have been received, the controller 330 goes to step S555; otherwise, the controller 330 goes to step S545.

At step S555, the controller 330 sends a signal to either the second party's control unit 225 to re-connect the subscriber or to the service provider's control unit 235 so that the stored information service can be resumed at the bookmarked place. Control then goes to step S510 and waits for another caller. At step S545, the controller 330 informs the subscriber of the control unit's message and performs any related subscriber functions and goes to step S560 and ends.

Figure 6:
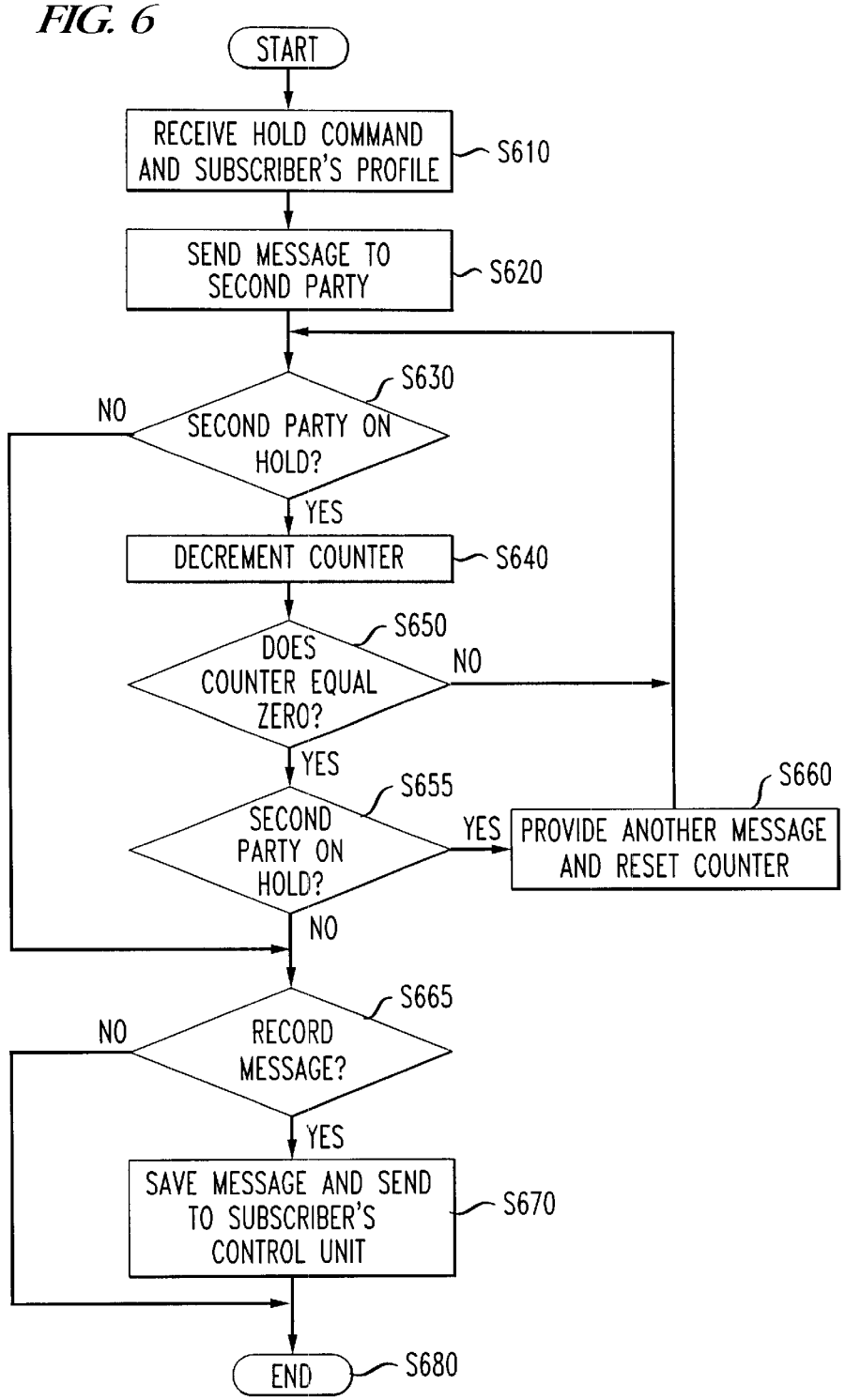
FIG. 6 is a flowchart of the automatic barge-in process for the control unit of a barged-in party.

FIG. 6 is a flowchart of the monitoring process for the call between the subscriber and the third party. At step S610, the controller 330' receives a hold command and the subscriber profile information including any personalized messages and other procedures related to handling the second ("barged-out") party. The controller 330' then goes to step S620. At step S620, the controller 330' sends a message to the second party which gives the second party the option to leave a message, hold, receive a call-back, etc. The controller 330' then goes to step S630.

At step S630, the controller 330' determines whether the second party has decided to hold. If the second party does not hold, the controller 330' goes to step S665. At step S665, the controller 330' determines whether the second party has left a message or goes on-hook, for example. If the second party did not leave a message, the controller 330' goes to step S680 and ends. If the second party left a message, the controller 330' goes to step S670. At step S670, the controller 330' saves the message in the memory 320 or the external database through database interface 350, sends the message to the subscriber's control unit 220, and goes to step S680 and ends.

If, at step S630, the second party has decided to hold the process goes to step S640 where a counter which has been set to a predetermined value by the subscriber's profile, for example, is decremented and the controller 330' then goes to step S650. At step S650 the controller 330' determines whether the counter equals. If the counter has not reached zero, the controller 330' jumps back to step S630 to determine whether the second party is still holding.

If however, at step S650, the controller 330' determines that the counter has reached zero at step S650, then the controller 330' goes to step S655. At step S655, the controller 330' determines whether the second party is still on hold. If the second party is still on hold the controller 330' goes to step S660. At step S660 the controller provides another message to the party, resets the counter and jumps back to step S630. However, if the controller 330 determines at step S655 that the second party is no longer on hold the controller 330' jumps to step S665. At step S665, the controller 330 determines whether the second party has left a message or hung-up, for example. If the second party did not leave a message, the controller 330 goes to step S680 and ends. If the controller 330 determines that the second party left a message at step S665 the controller goes to step S670. At step S670, the controller 330 saves the message in the memory 320 or the external database through database interface 350, sends the message to the subscriber's control unit 220, and goes to step S680 and ends.

FIG. 7 is a flowchart describing the automatic barge-in device 150 process for the service provider's control unit 235. At step S710, the controller 330" receives a hold command and subscriber's profile information. The controller 330" then goes to step S720. At step S720 the controller 330" sets a bookmark at the location where the stored information service is interrupted and goes to step S730. At step S730, a counter which has been set to a predetermined limit according to the subscriber's profile information, is decremented. The controller 330" then goes to step S740. At step S740, the controller 330" determines whether the counter has reached zero. If the counter has reached zero, the controller 330" goes to step S750 and sends a message to the controller 330 of subscriber's control 220 unit and goes to step S780 and ends. If the counter has not reached zero at step S740, the controller 330" determines whether a continue command is received at step S760. At step S760, if a continue command is received, the controller goes to step S770. At step S770, the controller 330" resumes the stored information service at the bookmarked location and goes to step S780 and ends. If, at step S760, the controller 330" determines that the continue command has not been received, the controller 330" jumps back to step S730 and decrements the counter.

The automatic barge-in device 150 may be implemented on a general purpose computer. However, the automatic barge-in device 150 may also be implemented using a special purpose computer, a programmed microprocessor or microcontroller and peripheral integrated circuit elements, and Application Specific Integrated Circuits (ASIC) or other integrated circuits, a hardwired electronic or logic circuit, such as a discrete element circuit, a programmable logic device such as a PLD, PLA, FGPA, or PAL, or the like. Furthermore, the functions of the automatic barge-in device 150 may be performed by a standalone unit or distributed throughout a communications system. In general, any device performing the functions of an automatic barge-in device 150, as described herein, can be implemented.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention as described in the following claims.

What is claimed is:

1. A method for operating an automatic barge-in system for barging-in on a first call between a first party and at least one other barged-out party, comprising:

receiving a second call from a barge-in party;

connecting a second call from the barge-in party with the first party, based on a first party profile that indicates that the first party desires to be connected to the barge-in party; and disconnecting the first call between the first party and the barged-out party if the second call is connected to the first party, wherein the barged-out party is a stored information service provider.

2. The method of claim 1, further comprising:

placing the barged-out party on hold.

3. The method of claim 1, further comprising:

receiving a message from the barged-out party; and storing the message in the database.

4. The method of claim 3, further comprising:

providing the barged out party's message to the first party after the call between the first party and the barge-in party terminates.

5. The method of claim 4, further comprising:

setting a counter to a value; and decrementing the counter, wherein when the value of the counter equals zero, the barged-out party is provided another message.

6. The method of claim 5, further comprising:

re-connecting the barged-out party with the first party if the call between the first party and the barge-in party terminates.

7. The method of claim 1, further comprising:

calling back the barged-out party when the call between the first party and the barge-in party terminates.

8. The method of claim 1, further comprising:

placing a marker to identify a position in the stored information where the call was interrupted.

9. The method of claim 8, further comprising:

setting a counter to a value;

decrementing the counter, wherein when the value of the counter equals zero, the first party is logged-off the stored information service.

10. The method of claim 9, further comprising:

re-connecting the first party to the stored information service provider if the call between the first party and the barge-in party terminates; and restarting the stored information service at the marker.

11. The method of claim 1, further comprising:

receiving a third call from another barge-in party;

connecting the third call from the another barge-in party with the first party, based on the first party profile; and disconnecting the second call between the first party and the barge-in party if the third call is connected to the first party.

12. An automatic barge-in device for operating an automatic barge-in system for barging-in on a first call between a first party and at least one other barged-out party, comprising:

a memory; and a controller that receives a second call from a barge-in party, connects the second call from the barge-in party with the first party, based on a first profile that indicates that the first party desires to be connected to the barge-in party and disconnects the first call between the first party and the barged-out party if the second call is connected to the first party, wherein the barged-out party is a stored information service provider.

13. The device of claim 12, wherein the controller places the barged-out party on hold.

14. The device of claim 12, wherein the controller receives a message from the barged-out party and stores the message in the memory.

15. The device of claim 14, wherein the controller provides the barged-out party's message to the first party after the call between the first party and the barge-in party terminates.

16. The device of claim 15, wherein the controller sets a counter to a value and decrements the counter, wherein when the value of the counter equals zero, the controller provides the barged-out party with another message.

17. The device of claim 16, wherein the controller re-connects the barged-out party with the first party if the call between the first party and the barge-in party terminates.

18. The device of claim 12, wherein the controller calls back the barged-out party when the call between the first party and the barge-in party terminates.

19. The device of claim 12, wherein the controller places a marker to identify a position in the stored information service where the call was interrupted.

20. The device of claim 19, wherein the controller sets a counter to a value and decrements the counter, wherein when the value of the counter equals zero, the controller logs the first party off the stored information service.

21. The device of claim 20, wherein the controller re-connects the first party to the stored information service provider if the call between the first party and the barge-in party terminates and restarts the stored information service at the marker.

22. The device of claim 12, wherein the controller receives a third call from another barge-in party, connects the third call from the another barge-in party with the first party, based on the first party profile, and disconnects the second call between the first party and the barge-in party if the third call is connected to the first party.

* * * * *